United States Patent
Liu (10) Patent No.: US 8,446,990 B2
(45) Date of Patent: May 21, 2013

(54) METHOD AND APPARATUS FOR CARRIER FREQUENCY OFFSET SYNCHRONIZATION OF ORTHOGONAL FREQUENCY DIVISION MULTIPLEXING RECEIVERS

(75) Inventor: Guanghui Liu, Suwon-si (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 1261 days.

(21) Appl. No.: 12/194,091

(22) Filed: Aug. 19, 2008

(65) Prior Publication Data
US 2009/0060101 A1    Mar. 5, 2009

(30) Foreign Application Priority Data
Sep. 5, 2007  (KR) .................. 10-2007-0089948

(51) Int. Cl.
*H03D 1/00* (2006.01)
*H04L 27/06* (2006.01)
(52) U.S. Cl.
USPC ........... 375/343; 375/259; 375/342; 375/344; 375/364
(58) Field of Classification Search
USPC ......... 375/130, 140–143, 145, 147, 149–150, 375/152, 259, 316, 340, 343–346, 354, 356–357, 359, 362, 364–368, 371, 373, 375
See application file for complete search history.

(56) References Cited

U.S. PATENT DOCUMENTS

| | | | |
|---|---|---|---|
| 6,618,452 B1* | 9/2003 | Huber et al. | 375/343 |
| 2006/0133526 A1 | 6/2006 | Zhang et al. | |
| 2008/0273646 A1* | 11/2008 | Ammar et al. | 375/371 |

FOREIGN PATENT DOCUMENTS

| | | |
|---|---|---|
| CN | 1253676 | 5/2000 |
| CN | 1345138 | 4/2002 |
| CN | 1361519 | 7/2002 |
| CN | 1543102 | 11/2004 |
| CN | 1677911 | 10/2005 |
| CN | 1750530 | 3/2006 |
| KR | 1020040105519 | 12/2004 |
| KR | 1020040107563 | 12/2004 |
| WO | 2005/064867 | 7/2005 |

OTHER PUBLICATIONS

First Office Action issued by Chinese Patent Office dated Aug. 29, 2012 in corresponding Chinese Appln. No. 200810184222.8.

* cited by examiner

*Primary Examiner* — David C. Payne
*Assistant Examiner* — James M Perez
(74) *Attorney, Agent, or Firm* — F. Chau & Associates, LLC

(57) ABSTRACT

A carrier frequency offset (CFO) estimation and synchronization method and apparatus of an orthogonal frequency division multiplexing (OFDM) receiver receiving an OFDM modulated signal. The OFDM receiver's CFO synchronization method includes step (a) performing an initial CFO estimation pull-in step using double correlation, step (b) performing a coarse residue CFO estimate acquisition step using independent combination of the double correlation and autocorrelation, and step (c) performing a small residue CFO tracking step by using the double correlation. Aspects of the invention solves the problems in the related art that a CFO tracking range cannot be reliably used in practice when the CFO tracking range is too narrow and a CFO estimation error increases when the CFO tracking range is too wide.

22 Claims, 6 Drawing Sheets

METHOD AND APPARATUS FOR CARRIER FREQUENCY OFFSET SYNCHRONIZATION OF ORTHOGONAL FREQUENCY DIVISION MULTIPLEXING RECEIVERS

CROSS-REFERENCE TO RELATED PATENT APPLICATION

This application claims priority, under 35 U.S.C. §119, of Korean Patent Application No. 10-2007-0089948, filed on Sep. 5, 2007, in the Korean Intellectual Property Office, which is incorporated by reference herein in its entirety.

BACKGROUND OF THE INVENTION

1. Field of the Invention

The present invention relates to an orthogonal frequency division multiplexing (OFDM) receiver receiving an OFDM modulated signal, and more particularly, to a method and apparatus for a OFDM receiver's carrier frequency offset (CFO) synchronization.

2. Description of the Related Art

Digital Television Terrestrial Broadcasting (DTTB) services have been available in North America and Europe since November 1998. Tsinghua University suggested a new standardization draft for China-oriented terrestrial digital television (DTV-T). This draft relates to a broadcasting standard called terrestrial digital multimedia/television broadcasting (DMB-T). DMB-T uses a new modulation scheme called time domain synchronous orthogonal frequency division multiplexing (TDS-OFDM).

The Standardization Administration of China, established a standard for Terrestrial Digital Broadcasting, number GB20600-2006 entitled 'Framing structure, Channel coding and modulation for digital television terrestrial broadcasting system'. The new official standard issued in August 2006, more generally called DMB-T/H (Digital Multimedia Broadcasting Terrestrial/Handheld) DMB-T/H is a result of work at both the Tsinghua University in Beijing and Jiaotong University in Shanghai and is thought to be more a co-existence of the two separate standards developed by these universities rather than an all embracing single standard integrating both approaches. Tsinghua's system TDS-OFDM (Time Domain Synchronous OFDM) uses multicarriers just like the DVB-T and Japanese ISDB-T whilst Jiatongs ADTB-T (Advanced Digital Television Broadcast Terrestrial) is a single carrier vestigial sideband system based on the US 8-VSB standard.

In DMB-T, inverse discrete Fourier transform (IDFT) is applied to data modulated and transmitted by a TDS-OFDM transmitter as in cyclic prefix orthogonal frequency division multiplexing (CP-OFDM). An innovation of the DMB-T standard that can improve the performance of the system is the design of the PN sequence frame header and symbol guard interval insertion that can achieve rapid and efficient channel estimation and equalization, A pseudo-noise (PN) (instead of a cyclic prefix) is inserted into a guard interval and used as a training signal. The PN sequence can also be used as a time domain equalizer training sequence.

The combination of a guard interval and a training signal, can reduce overhead when a broadcast signal is transmitted, increase channel use efficiency, and improving performance of a synchronizer and a channel estimator included in a DMB-T broadcast signal receiver.

Figure 1:
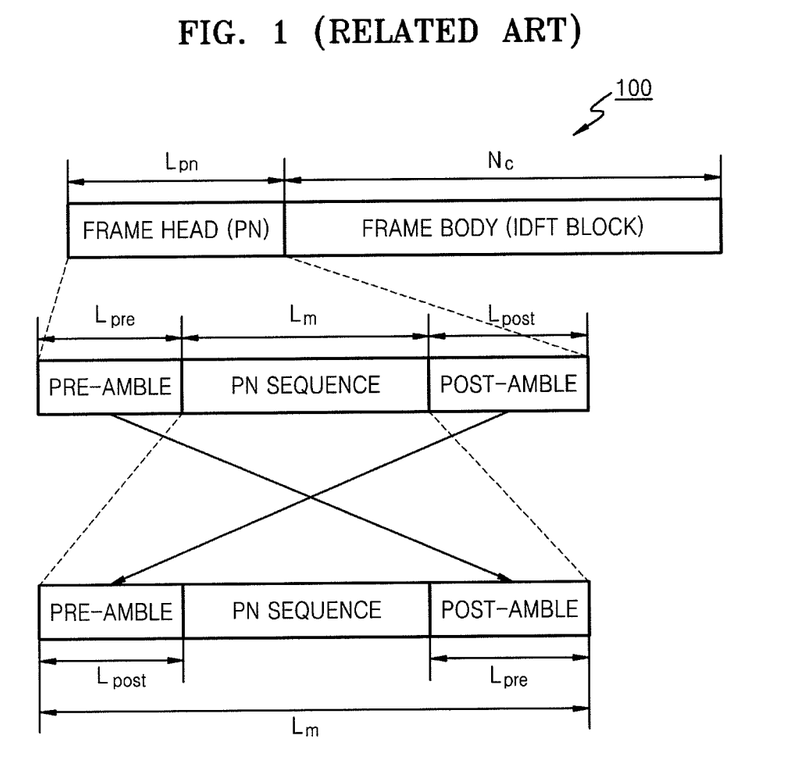
FIG. 1 illustrates the structure of a time domain synchronous orthogonal frequency division multiplexing (TDS-OFDM) frame 100.

FIG. 1 illustrates a structure of a time domain synchronous orthogonal frequency division multiplexing (TDS-OFDM) signal frame 100.

The TDS-OFDM frame 100 includes a frame head (also known as frame sync) and a frame body. The baseband symbol rates for both frame sync (frame head) and frame body are the same, and are defined as 7.56 MSPS.

The frame body is an inverse discrete Fourier transform (IDFT) block on which data to be transmitted is carried, and in general, the IDFT block includes 3,780 pieces ("symbols") of stream data. In the time domain, samples in each block correspond to the 3780 sub-carriers in the frequency domain of the block. The block in its time domain has 3780 samples of the inverse discrete Fourier transform (IDFT) of the 3780 sub-carriers in its frequency domain. There are 36 symbols of system information and 3744 symbols of data in one frame body. Thus, an IDFT block size $N_c$ is 3,780. Because there are 3780 carriers and the carrier spacing is 2 kHz, so the bandwidth of multi-carrier mode is 7.56 MHz.

The frame head can also be called 'frame sync' or 'frame header'. The size of the frame head depends on a guard interval mode. In general the guard interval mode is ⅑ or ¼. When the guard interval mode is ⅑, the frame head size $L_{pn}$ is 420 and the time interval of the header is 55.6 μs, and when the guard interval mode is ¼, the frame head size $L_{pn}$ is 945 and the time interval of the header is 125 μs. When the guard interval mode is ⅑, the frame head includes 420 pieces of data including 255 PN sequences, a preamble before the PN sequences, and a postamble after the PN sequences. The pre-amble and post-amble are cyclical extensions of the PN sequences. In other words, 420 pieces of data (that is ⅑ the amount of the 3,780 pieces of data in the IDFT block) are used for the frame head. For all signal structure modes, the frame body includes 3780 symbols and the time interval of frame body is 500 μs. Thus, a single OFDM frame includes a frame head including 420 pieces of data and a frame body including 3,780 pieces of data and so the time interval of a signal frame is 555.6 μs, or 625 μs respectively.

The frame head includes pseudo-noise (PN) sequences, wherein PN used in the frame head can use sequences whose order is 8 (m=8). A PN sequence is defined as an 8th order m-sequence and is implemented by a Fibonacci Type linear feedback shift register (LFSR). Its characteristic polynomial may be defined as: $P(x)=x^8+x^6+x^5+x+1$. When order m=8, 255 different sequences can be generated, and the sequences can be extended using a preamble and a postamble to be used in a guard interval.

The preamble and the postamble are repeated intervals of PN sequences for cyclic extension of the PN sequences. For example, cyclic extension is performed by adding the first 82 PN sequences of 255 PN sequences in a frame head to the end of the 255 PN sequences as a postamble and adding the last 83 PN sequences of the 255 PN sequences to the first of the 255 PN sequences as a preamble. Thus, the total size of frame head is 83+255+82=420 ($L_{pn}=L_{pre}+L_m+L_{post}$).

The structure of the data frame 100 may vary according to a guard interval, and the number of pieces of data in each frame may be different.

Such a data frame is disclosed in Korean Patent Publication No. 2007-0024298.

OFDM systems provide orthogonal sub-carriers that guarantee exact reconstruction of the original data. To obtain orthogonality between subchannels in OFDM systems, one of the assumptions which are made, is exact knowledge of the carrier frequency at the receiver. However, OFDM systems are also susceptible to errors relating to carrier frequency offset (CFO). CFO generally arises when the demodulation carrier frequency does not exactly match the modulating carrier frequency. This may result from, for example, Doppler effect or mismatched crystal frequency at the transmitter and receiver. CFO between transmitter and receiver essentially destroys the orthogonality of the OFDM symbol and can cause inter-carrier interference (ICI) and inter-symbol interference (ISI). With CFO between transmitter and receiver some of the signal power will be transferred into interference power, i.e. noise, reducing the system performance. Thus Carrier Frequency Offset CFO is a major contributor to the inter-carrier interference (ICI) in OFDM systems. In OFDM systems, carrier frequency offset (CFO) must be estimated and compensated (synchronizing, tracking) at the receiver to maintain orthogonality. In OFDM systems it is desired to synchronize the carrier frequency at the receiver with the carrier of the transmitter. In TDS-OFDM, fast synchronization acquisition and channel estimation is performed using above-described PN sequence code that is a time domain synchronization signal.

In the prior art, a correlation operation is used as a method for the fast synchronization acquisition and channel estimation. The correlation operation is disclosed in a reference published by Z. W. Zheng, Z. X. Yang, C. Y. Pan, and Y. S. Zhu, titled "Novel Synchronization for TDS-OFDM-based Digital Television Terrestrial Broadcast Systems", IEEE Trans. Broadcast., vol. 50, no. 2, pp. 148-153, June 2004. Thus, a carrier frequency offset (CFO) tracking range obtained by using the correlation operation between a received signal r(n) and a sequence PN(n) is $\pm N_c \Delta f / 2L_m$, wherein $\Delta f$ denotes tone spacing, and $N_c$ and $L_m$ are illustrated in FIG. 1. For example, when $N_c$=3,780, $\Delta f$=2 KHz, and $L_m$=255, a tracking range cannot be over ±15 KHz, and the tracking range is too narrow to be used in practice.

In the prior art, a double correlation operation is used as another method for the fast synchronization acquisition and channel estimation. The double correlation operation is disclosed in a reference published by F. Tufvesson, O. Edfors, and M. Faulkner, titled "Time and frequency synchronization for OFDM using PN-sequence preambles", in Proc. VTC' 99, vol. 4, pp. 2203-2207, September 1999.

By using the double correlation operation disclosed in the reference, the CFO tracking range can be widened, however, the CFO estimation error increases.

Thus, by considering all cases in the prior art, a CFO tracking range cannot be reliably used in practice when the CFO tracking range is too narrow, and a CFO estimation error increases when the CFO tracking range is too wide.

Thus, an apparatus and method for estimating a CFO of an OFDM receiver and performing CFO synchronization are required.

SUMMARY OF THE INVENTION

Aspects of the present invention provide a reliable method and apparatus for CFO estimation and synchronization in OFDM receivers.

According to an aspect of the present invention, there is provided a carrier frequency offset (CFO) synchronization method of an orthogonal frequency division multiplexing (OFDM) receiver using pseudo-noise (PN) sequences in a guard interval of an OFDM frame as a training signal, wherein the OFDM frame comprises a frame head and a frame body, the CFO synchronization method comprising: step (a1) calculating a CFO estimation value $e^\Lambda$ by widening a CFO tracking range by setting a correlation interval P between a first correlation operation $C_1$ and a second correlation operation $C_2$ to be less than a predetermined value in double correlation in which the first correlation operation $C_1$ and the second correlation operation $C_2$ are used to calculate the CFO estimation value $e^\Lambda$; step (b1) calculating the CFO estimation value $e^\Lambda$ by narrowing the CFO tracking range by setting the correlation interval P to be greater than the predetermined value in step (a1); and step (c1) calculating the CFO estimation value $e^\Lambda$ using auto-correlation.

The CFO synchronization method may further comprise (d1) calculating the CFO estimation value $e^\Lambda$ by combining step (b1) and step (c1) that are independent to each other.

In step (a1), the predetermined value of the correlation interval P may be 44.

In step (b1), the predetermined value of the correlation interval P may be 4200.

In step (c1), a correlation length $L_a$ of the auto-correlation may be the sum of sizes of a preamble and a postamble that are located in the frame head, and a correlation interval Q of the auto-correlation may be obtained by subtracting the correlation length $L_a$ from a length of the frame head.

step (d1) may comprise calculating the CFO estimation value $e^\Lambda$ by using a phase offset $\Phi_l$ calculated in step (b1) and a phase offset $\Phi_s$ calculated in step (c1).

According to another aspect of the present invention, there is provided a carrier frequency offset (CFO) synchronization method of an orthogonal frequency division multiplexing (OFDM) receiver using pseudo-noise (PN) sequences in a guard interval as a training signal, wherein an OFDM frame comprises a frame head and a frame body, the CFO synchronization method comprising: step (a) performing an initial CFO estimation pull-in step using double correlation; and step (b) performing a coarse residue CFO estimate acquisition step using independent combination of the double correlation and auto-correlation.

The CFO synchronization method may further comprise step (c) performing a small residue CFO tracking step by using the double correlation.

In step (a), an initial CFO estimate may be pulled in by widening a CFO tracking range by setting a correlation interval P, which is a parameter of the double correlation, to be less than a predetermined value.

The predetermined value of the correlation interval P in step (a) may be 44.

In step (b), a coarse residue CFO estimate may be acquired by using a phase offset $\Phi_l$ calculated using the double correlation and a phase offset $\Phi_s$ calculated using the auto-correlation.

In the double correlation of step (b), a CFO tracking range may be narrowed by setting the correlation interval P for calculating the phase offset $\Phi_s$ to be 4200.

In the auto-correlation of step (b), a correlation interval Q for calculating the phase offset $\Phi_l$ maybe 255.

In step (c), a small residue CFO may be tracked by narrowing the CFO tracking range by setting the correlation interval P, which is a parameter of the double correlation, to be greater than the predetermined value.

The predetermined value of the correlation interval P in step (c) may be 4,200.

The CFO synchronization method may further comprise step (d) performing state conversion to step (b) after calculating the initial CFO estimate as repeatedly as a predetermined number $N_1$ when the initial CFO estimation pull-in step is performed in step (a).

The predetermined number $N_1$ in step (d) may be 50.

The CFO synchronization method may further comprise step (e) performing state conversion to step (c) by determining whether an integer Kl denoting that a residue CFO is a very small value maintains zero as many times as a predetermined number M when the coarse residue CFO estimate acquisition step is performed in step (b).

The predetermined number M in step (e) may be 5.

The CFO synchronization method may further comprise step (f) performing state conversion to step (b) by determining whether an integer K1 denoting that the residue CFO is a very small value does not maintain zero as many times as a predetermined number M when the small residue CFO tracking step is performed in step (c).

The predetermined number M in step (f) may be 5.

According to another aspect of the present invention, there is provided a carrier frequency offset (CFO) estimation apparatus of an orthogonal frequency division multiplexing (OFDM) receiver, the CFO estimation apparatus comprises: a correlator performing a correlation operation; and a CFO estimator calculating a CFO estimation value $e^\Lambda$ by using an output signal of the correlator, wherein the correlator and the CFO estimator pull-in an initial CFO by using double correlation, acquire a coarse residue CFO estimate by independently using the double correlation and auto-correlation, and track a small residue CFO by using the double correlation.

The attached drawings for illustrating preferred embodiments of the present invention are referred to in order to provide a sufficient understanding of the present invention to persons skilled in the art.

Hereinafter, the present invention will be described in detail by explaining preferred embodiments of the invention with reference to the attached drawings. Like reference numerals in the drawings denote like elements.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 2:
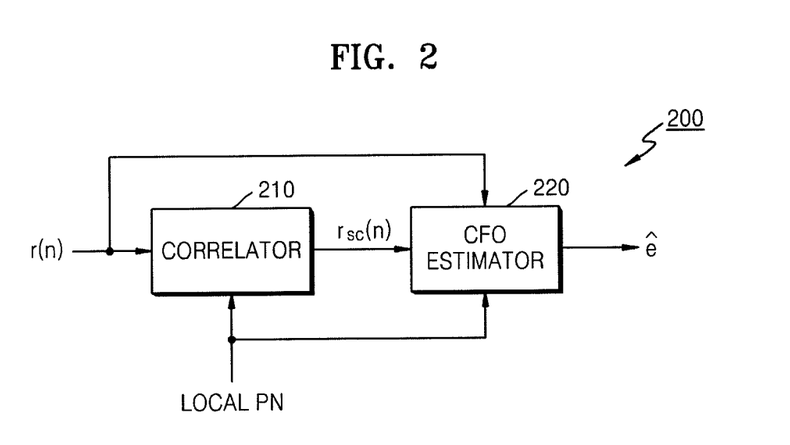
FIG. 2 is a block diagram of a carrier frequency offset (CFO) estimation apparatus 200 according to an exemplary embodiment of the present invention.

FIG. 2 is a block diagram of a carrier frequency offset (CFO) estimation apparatus 200 according to an exemplary embodiment of the present invention. The CFO estimation apparatus 200 according to the current embodiment includes a correlator 210 and a CFO estimator 220.

The correlator 210 receives a signal r(n) generates an output signal $r_{sc}(n)$ by using the received signal r(n) and a local copy of the pseudo-noise (PN) sequences generated by the correlator 210.

The CFO estimator 220 outputs a CFO estimation value $e^\Lambda$ by using the received signal r(n), the local copy of the PN sequences, and the output signal $r_{sc}(n)$. The CFO estimation value $e^\Lambda$ is input to a numerically-controlled oscillator (not shown) and used as a feedback signal.

A CFO estimation method according to an embodiment of the present invention includes a plurality of steps including [I-a], a step [I-b], a step [II], and a step [III]. Each step will now be described.

Step [I-a]

The CFO estimation value $e^\Lambda$ is calculated by using double correlation.

A first correlation operation $C_1$ and a second correlation operation $C_2$ respectively defined by Equations 1 and 2.

$$C_1(n) = \sum_{k=0}^{L-1} r(n+k)PN^*(k_0+k) \qquad \text{(Equation 1)}$$

$$C_2(n) = \sum_{k=0}^{L-1} r(n+k+P)PN^*(k_0+k+P) \qquad \text{(Equation 2)}$$

Here, $k_0$ denotes a starting point of the first correlation operation $C_1$, L denotes a correlation length, * denotes conjugate, P denotes a correlation interval between the first correlation operation $C_1$ and the second correlation operation $C_2$. Equation 3 shows an operation result C(n) between the first correlation operation $C_1$ and the second correlation operation $C_2$.

$$C(n) = C_1^* \cdot C_2 \qquad \text{(Equation 3)}$$

Here, if it is assumed that $n=n_0$, a correlation peak value is $C(n_0)$, and the CFO estimation value $e^\Lambda$ is obtained by using Equation 4.

$$e^\Lambda = angl(C(n_0)) \cdot \frac{Nc}{2\pi P} \qquad \text{(Equation 4)}$$

Here, $N_c$ denotes an inverse discrete Fourier transform (IDFT) block size as illustrated in FIG. 1, i.e., 3,700, P denotes a correlation interval between the first correlation operation $C_1$ and the second correlation operation $C_2$, and angl(x) denotes a phase angle of a complex number x.

Since the phase angle of a complex number x, i.e., angl(x), has a value between $-\pi$ and $+\pi$, a CFO tracking range is obtained by using Equation 5.

$$-\frac{Nc}{2P} \leq e^\Lambda \leq \frac{Nc}{2P} \qquad \text{(Equation 5)}$$

For example, if a terrestrial digital video broadcasting (DVB-T) F1 channel is an ideal channel, the correlation peak value $C(n_0)$ is obtained by using Equation 6.

$$C(n_0) = \left(\frac{2}{Nc} \cdot \frac{\sin(\pi eL/Nc)}{\sin(\pi e/Nc)}\right)^2 \cdot e^{j2\pi Pe/Nc} \qquad \text{(Equation 6)}$$

Here, if the correlation interval P between the first correlation operation $C_1$ and the second correlation operation $C_2$ is small, the CFO tracking range can be widened according to Equation 4. However, the correlation interval P must be maintained to at least a value similar to the correlation length L (P≅FL) because it is difficult to obtain a peak value according to Equation 6 if the correlation length L is too small.

In addition, in order to prevent parasitical peaks generated by a preamble (referring to FIG. 1) and a postamble (referring to FIG. 1), $k_0$ of Equations 1 and 2 is maintained to $k_0 = L_{post}$ (length of the postamble, referring to FIG. 1).

Figure 3:
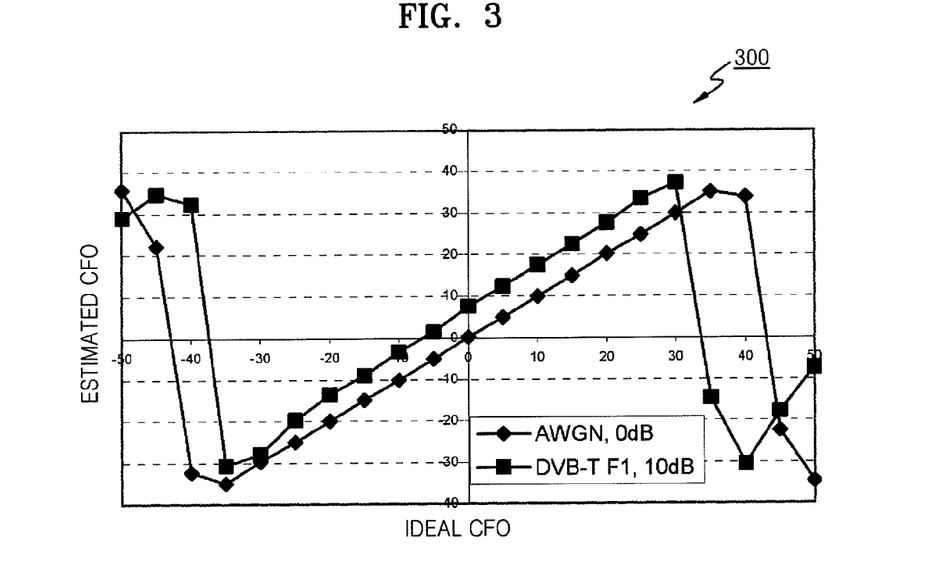
FIG. 3 is a simulation diagram 300 of an additive white Gaussian noise (AWGN) channel and a terrestrial digital video broadcasting (DVB-T) F1 channel.

Considering the above, the parameters of step [I-a] may be that $N_c=3,780$, $L_{pn}=420$, $L_m=255$, $L_{pre}=83$, $L_{post}=82$, $k_0=82$, $L=45$, and $P=44$. In this case, the maximum CFO estimation value $|e_{max}^\wedge| \cong 43$, and a CFO is tracked with ±43. FIG. 3 is a simulation diagram of an additive white Gaussian noise (AWGN) channel and a DVB-T F1 channel. FIG. 3 shows an S-curve representing a result of the CFO tracking.

As described above, the step [I-a] is useful for initial CFO estimation pull-in with a small tracking precision and a wide tracking range.

Step [I-b]

Unlike the step [I-a], the step [I-b] has the characteristic that the tracking range is narrowed to increase the tracking precision. In order to narrow the tracking range, the correlation interval P must be increased.

Parameters in the step [I-b] may be that $k_0=0$, $L=255$, and $P=N_c+L_{pn}=4,200$. In this case, the CFO is tracked with ±0.45.

Figure 4:
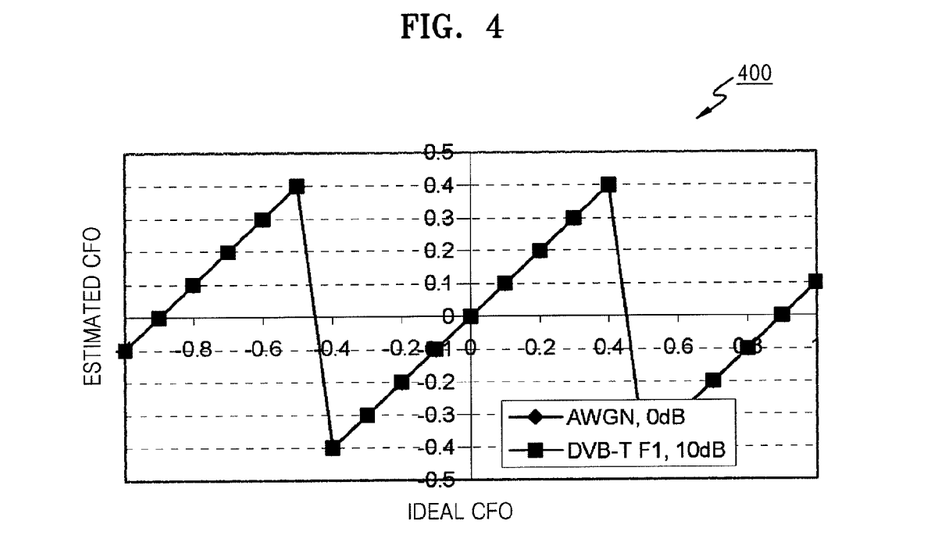
FIG. 4 is a simulation diagram 400 illustrating tracking precision of a DVB-T F1 channel.

FIG. 4 illustrates excellent tracking precision of a DVB-T F1 channel. FIG. 4 shows an S-curve for representing a result of the CFO tracking.

Since the step [I-b] has high tracking precision, the step [I-b] is useful for residue CFO estimate acquisition.

Step [II]

The step [II] exploits the fact that the preamble and the postamble illustrated in FIG. 1 are cyclic extension of the PN sequences.

Figure 5:
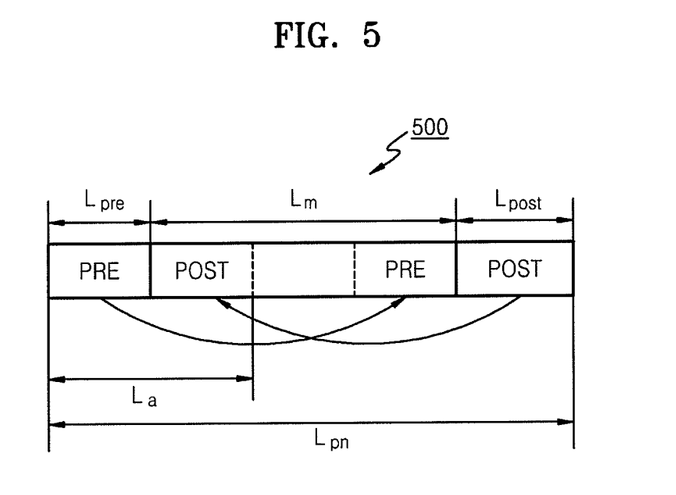
FIG. 5 illustrates a frame head 500 in the TDS-OFDM) frame in FIG. 1.

FIG. 5 illustrates the frame head 500 in the TDS-OFDM frame in FIG. 1. Auto-correlation exploiting the fact that the preamble and the postamble in the TDS-OFDM frame in FIG. 1 are cyclic extensions of the PN sequences is represented by using Equation 7.

$$A(n) = \sum_{k=n}^{n+La-1} r(k) \cdot r^*(k_0 + Q) \quad \text{(Equation 7)}$$

Here, a correlation length $L_a$ is the sum of sizes of the preamble and the postamble of the frame head shown in FIG. 5. Q denotes a correlation interval. Considering Equation 7, the CFO estimation value $e^\wedge$ is obtained by using Equation 8.

$$e^\wedge = angl(A(n_0)) \cdot \frac{Nc}{2\pi Q} \quad \text{(Equation 8)}$$

Equation 8 is similar to Equation 4. In equation 8, $A(n_0)$ denotes a correlation peak value and $A(n_0)$ is obtained by using Equation 9:

$$A(n_0) = \left(\frac{2}{Nc} \cdot \frac{\sin(\pi e La/Nc)}{\sin(\pi e/Nc)}\right)^2 \cdot e^{j2\pi Qe/Nc} \quad \text{(Equation 9)}$$

According to the above description, parameters in the step [II] may be that $L_a = L_{pn} - L_m = L_{pre} + L_{post} = 165$ and $Q = L_m = 255$. In this case, the CFO is tracked with ±7.4.

Table 1 collects the parameters and CFO results of steps [II], [I-a], and [I-b] for comparison.

TABLE 1

|  | Step [I-a] | Step [I-b] | Step [II] |
| --- | --- | --- | --- |
| Correlation length | L = 45 | L = 255 | $L_a$ = 165 |
| Correlation interval | P = 44 | P = 4,200 | Q = 255 |
| Tracking range | ±43 | ±0.45 | ±7.4 |

The step [II] is useful for coarse residue CFO estimate acquisition.

Step [III]

The step [III] widens the CFO tracking range by obtaining a new CFO estimation value using two independent CFO estimations. For example, it is possible to simultaneously use the step [I-b] in which the correlation interval P=4,200 and the step [II] in which the correlation interval Q=255.

The step [III] using two independent CFO estimations will now be described.

$$K_{s\text{-}max} = \text{round}\left(\frac{P_s \cdot e_{max}}{Nc}\right) \quad \text{(Equation 10)}$$

$$K_{l\text{-}max} = \text{round}\left(\frac{P_l \cdot e_{max}}{Nc}\right) \quad \text{(Equation 11)}$$

In Equations 10 and 11, $P_s$ and $P_l$ denote correlation intervals related to two independent CFO estimations. For example, if the independent steps [I-b] and [II] are used, it can be assumed that $P_l=4,200$, and $P_s=Q=255$. Here, the subscript l is the first letter of 'long', the subscript s is the first letter of 'short', and $e_{max}$ is the maximum CFO tracking range, which is the goal of the step [III]. The function round(a) is a function related to rounding and is defined by using Equation 12.

$$\text{round}(a) = \arg(\min|a-n|)_{n \in Z} \quad \text{(Equation 12)}$$

Based on Equations 11 and 12, an integer set S is calculated by using Equation 13.

$$S = \{x | x = k_s L_l - k_l L_s, k_s \in [-k_{s\text{-}max}, k_{s\text{-}max}], \\ k_l \in [-k_{l\text{-}max}, k_{l\text{-}max}]\} \quad \text{(Equation 13)}$$

Here, $L_l$ and $L_s$ are prime numbers to each other and are respectively defined by using Equations 14 and 15.

$$L_l = \frac{P_l}{gcd(P_l, P_s)} \quad \text{(Equation 14)}$$

$$L_s = \frac{P_s}{gcd(P_l, P_s)} \quad \text{(Equation 15)}$$

In Equations 14 and 15, the function gcd(x, y) denotes the greatest common divisor of x and y.

It is assumed that phase offsets are $\Phi_l$ and $\Phi_s$. For example, it can be assumed that a phase offset in the step [I-b] is $\Phi_l$, and a phase offset in the step [II] is $\Phi_s$. Then, Equations 16 and 17 can be obtained.

$$M = \frac{\Phi_l L_s - \Phi_s L_l}{2\pi} \quad \text{(Equation 16)}$$

$$F(M) = \arg(\min|M - n|)_{n \in S} \quad \text{(Equation 17)}$$

As known in Equation 13, since $k_s \in [-k_{s-max}, k_{s-max}]$, it can be known that the right term of Equation 18 below is an integer.

$$k_l = \frac{k_s L_l - F(M)}{L_s} \quad \text{(Equation 18)}$$

When the Equations described above are used, the new CFO estimation value $e^\wedge$ obtained by using the two independent CFO estimations of the step [III] is obtained by using Equation 19.

$$e^\wedge = \frac{2 \cdot k_l \cdot \pi + \Phi_l}{2\pi P_l} \cdot Nc \quad \text{(Equation 19)}$$

As described above, the steps [I-a], [I-b], [II], have been described. In addition, the step [III] is implemented by using the steps [I-b] and [II].

The CFO synchronization method according to an exemplary embodiment of the present invention using the steps [I-a], [I-b], [II], and [III] described above includes: (a) an initial CFO estimation pull-in step; (b) a coarse residue CFO estimate acquisition step; and (c) a small residue CFO tracking step.

The initial CFO estimation pull-in step is a large-scale pull-in step. Thus, the initial CFO estimation pull-in step is a step in which a tracking range is in a large scale by setting the correlation interval P to be small. The step [I-a] described above can be used for the initial CFO estimation pull-in step.

The coarse residue CFO estimate acquisition step is a small-scale acquisition step. The step [III] can be used for the coarse residue CFO estimate acquisition step. In addition, the step [III] can be implemented by using the steps [I-b] and [II].

The small residue CFO tracking step is a tracking step. Thus, the small residue CFO tracking step is a step in which a final CFO value becomes small enough to fit an OFDM demodulation standard by tracking a small residue CFO. In other words, a tracking range is narrowed by increasing the correlation interval P. The step [I-b] can be used for the small residue CFO tracking step.

Figure 6:
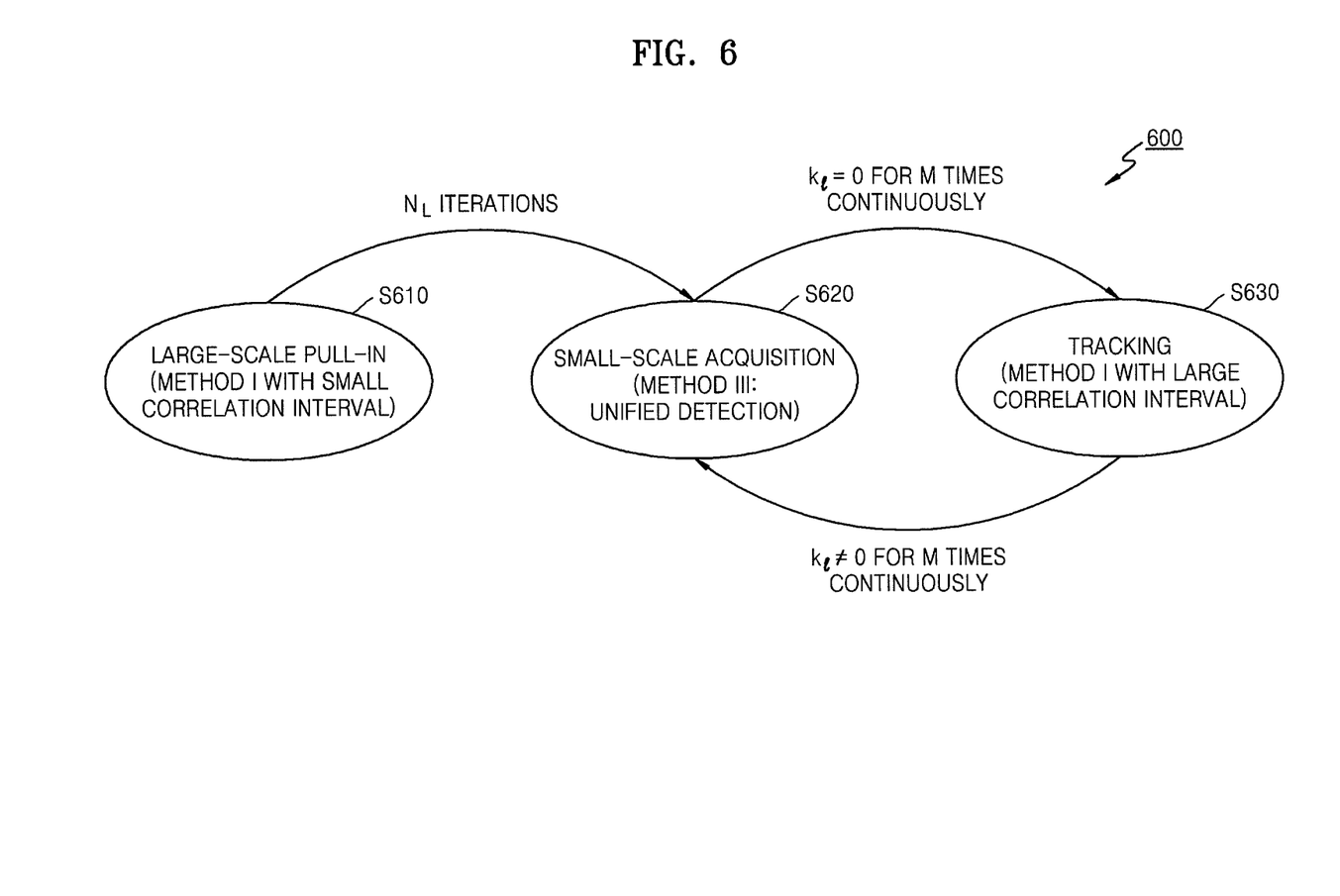
FIG. 6 is a state conversion diagram of a CFO synchronization method 600 according to an embodiment of the present invention.

FIG. 6 is a state conversion diagram of the CFO synchronization method 600 according to an exemplary embodiment of the present invention.

In FIG. 6, step S610 is the initial CFO estimation pull-in step. Step S620 is the coarse residue CFO estimate acquisition step. Step S630 is the small residue CFO tracking step.

Parameters ($N_L$, Kl, etc.) related to a state conversion condition illustrated in FIG. 6 will be described with reference to Table 2. Table 2 is pseudo code of the embodiment in the diagram illustrated in FIG. 6.

TABLE 2

(s1) Set $n_l=0$, $e^\wedge = 0$, iteration coefficient $\zeta_c$, $\zeta_f$, iterative times $N_L$, M ;
(s2) For each received OFDM frame, using step [ I -a] with small correlation interval is
to obtain one-shot CFO estimate $\Delta$ e, and the iterative CFO estimate $e^\wedge = e^\wedge$
+ $\zeta$ c * $\Delta$ e, nl= nl+1;
(s3) If nl < NL, then go back to step (s2) next OFDM frame, else jump to step (s4);
(s4) Set m=0, $T_{flag}=0$, Ka=0, parameters of step [II] La, Q, parameters of step [I-b] with
large correlation interval K0, L, P, parameter of step [III] $e_{max}$, then for step [III]
Pl=P, Ps=Q;
(s5) Generate the phase-offset φ l using step [I-b], generate the phase-offset
φ s using step [II], then based on step [III] get integer Kl. If Ka=Kl, then m=m+1,
else set m=0, Ka=Kl;
(s6) Conversion between state acquisition and state tracking can be implemented as
the following program:
If ($T_{flag}=0$) { // acquisition
  If (m<M) {
    $\Delta$ e=0, $e^\wedge = e^\wedge$ ;
    Go back to step (s5) next OFDM frame;
  } else {
    m=0;
    generate $\Delta$ e according to (equation 19), and $e^\wedge = e^\wedge + \Delta$ e;
    if (Ka=0) {
      set $T_{flag}=1$;
    }
    Go back to step (s5) next OFDM frame;
  }
} else { // tracking
  If (m<M) {
    $\Delta$ e= φ l * Nc /(2π P);
    $e^\wedge = e^\wedge + \zeta_f * \Delta$ e;
    Go back to step (s5) next OFDM frame;
  } else {
    m=0;
    if (Ka=0) {
      $\Delta$ e= φ l * Nc /(2π P);
      $e^\wedge = e^\wedge + \zeta_f * \Delta$ e;
      Go back to step (s5) next OFDM frame;
    } else {
      $\Delta$ e=0, $e^\wedge = e^\wedge$ ;
      set $T_{flag}=0$;
      Go back to step (s5) next OFDM frame;
    }
  }
}

The CFO synchronization method according to an embodiment of the present invention will now be described in more detail with reference to FIG. 6 and Table 2.

The steps (s1) through (s3) of Table 2 correspond to step S610 of FIG. 6 and the initial CFO estimation pull-in step, which is a step using the step [I-a] with a small correlation interval (a wide tracking range). The use of a comparison syntax, $n_I < N_L$, is to pull in an initial CFO estimate value $e^\Lambda$ after performing the step (s2) repeatedly with a repetition count number $N_L$.

The steps (s4) through (s6) of Table 2 correspond to steps S620 and S630 of FIG. 6, i.e., the coarse residue CFO estimate acquisition step and the small residue CFO tracking step.

The use of a comparison syntax, m<M, in the coarse residue CFO estimate acquisition step is to determine whether an integer Kl is as constant as a repetition number M after calculating the integer Kl by using the step [III]. Herein, Ka is a parameter used to temporarily store the integer Kl. In addition, the determination of whether Ka=0 is to determine whether Kl=0. Kl=0 means that a residue CFO is a very small value. By setting $T_{flag}=1$ in this state, conversion to the small residue CFO tracking step is performed.

In the small residue CFO tracking step, it is determined whether Ka=0. If Ka=0, a final CFO value $e^\Lambda$ is calculated. If Ka is not zero, conversion to the coarse residue CFO estimate acquisition step is performed by setting $T_{flag}=0$.

By performing the above-described processes, the CFO synchronization is achieved.

An example in which CFO synchronization is simulated will now be described.

Parameters related to a frame structure (referring to FIG. 1) are set to $N_c=3,780$, $L_{pn}=420$, $L_m=255$, $L_{pre}=83$, and $L_{post}=82$. In addition, parameters related to the step [I-a] with a small correlation interval are set to $k_0=82$, L=45, and P=44. In addition, parameters related to the step [I-b] with a coarse correlation interval are set to $k_0=0$, L=255, and $P=N_c+L_{pn}=4,200$. In addition, parameters related to the step [III] are set to $\zeta_c=1/32$, $\zeta_f=1/16$, $N_L=50$, M=5, $Q=L_m=255$, and $e_{max}=14.0$.

Figure 7:
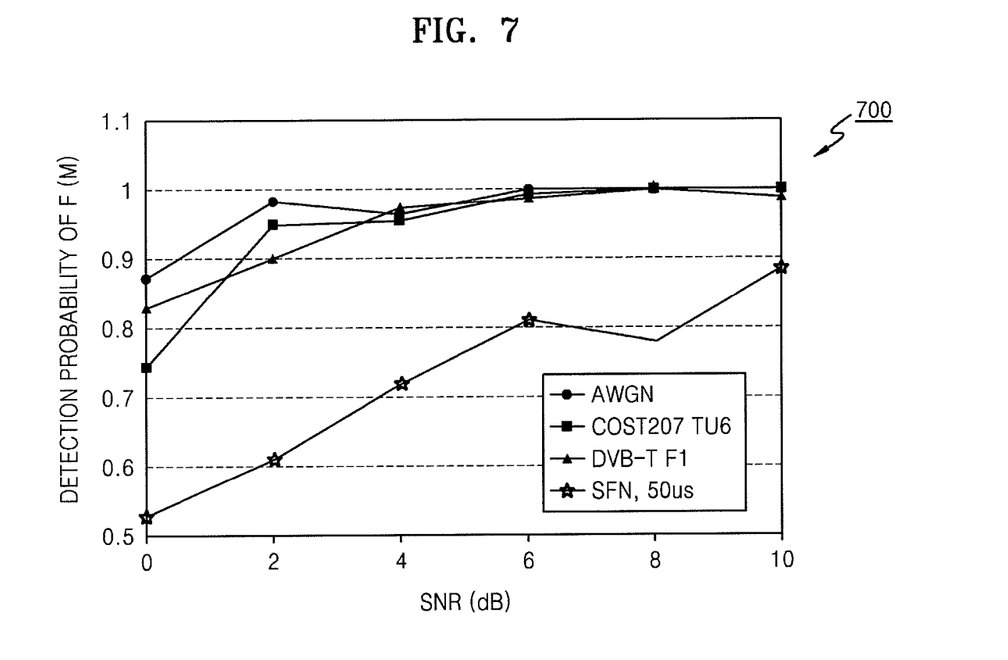
FIG. 7 is a graph illustrating detection probabilities 700 of an integer F(M)
Figure 8:
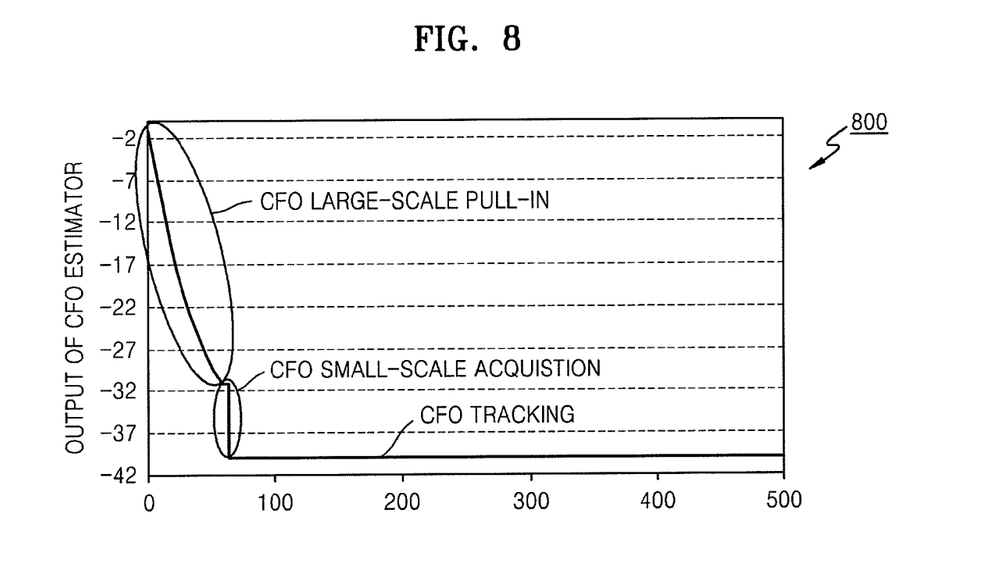
FIG. 8 is a graph illustrating a closed-loop simulation result 800 when an ideal CFO is -40.0.
Figure 9:
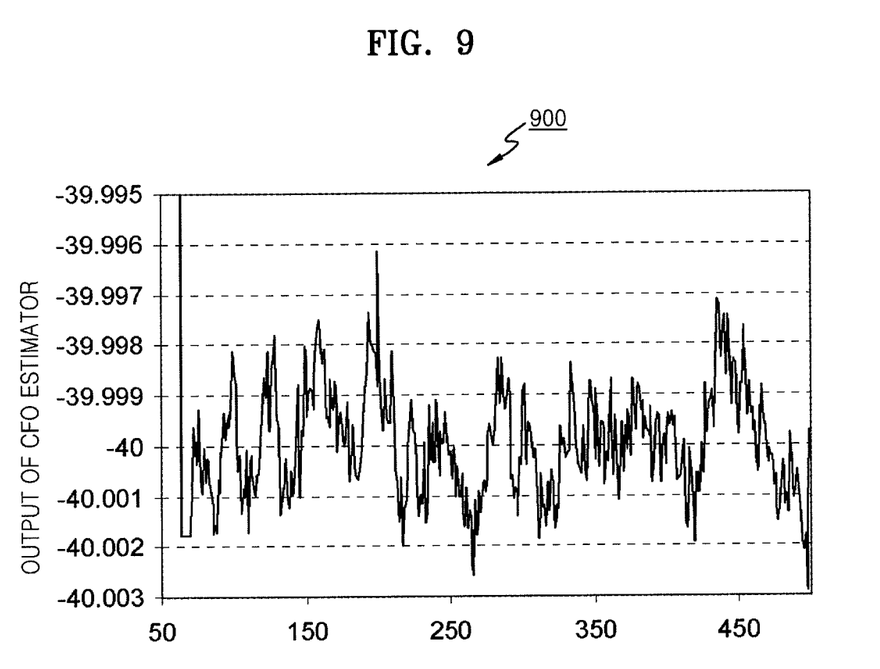
FIG. 9 is a magnified graph of the result 900 of tracking step shown in FIG. 8.

Simulation results obtained based on these parameters are illustrated in FIGS. 7 through 9.

FIG. 7 illustrates detection probabilities 700 of an function F(M). The function F(M) corresponds to Equation 17 that is an equation related to the step [III]. A channel model "SFN 50 μs" of FIG. 7 is a two-path channel having 1 echo whose delay is 50 μs. As known in FIG. 7, a high detection probability causes a CFO to be easily acquired in a $\pm e_{max}$ range.

FIG. 8 illustrates a closed-loop simulation results 800 when an ideal CFO is −40.0. A channel used for the simulation is "SFN, 50 μs", and a signal-to-noise ratio (SNR) is 10 dB. The results of three steps, i.e., pull-in, acquisition, and tracking, are shown in FIG. 8.

FIG. 9 is a magnified graph of the result 900 of tracking step illustrated in FIG. 8. Referring to FIG. 9, when the ideal CFO is −40.0, a residue CFO is ±0.5%, thus satisfying the OFDM demodulation standard.

As described above, an aspect of the present invention providing an OFDM receiver's CFO synchronization method and apparatus solves the problems that a CFO tracking range cannot be used in reality when the CFO tracking range is too narrow, and that a CFO estimation error increases when the CFO tracking range is too wide.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A carrier frequency offset (CFO) synchronization method of an orthogonal frequency division multiplexing (OFDM) receiver, wherein an OFDM frame comprises a guard interval including pseudo-noise (PN) sequences as a training signal, the CFO synchronization method comprising:

step (a1) calculating a CFO estimation value $e^\Lambda$ by widening a CFO tracking range by setting a correlation interval P between a first correlation operation $C_1$ and a second correlation operation $C_2$ to be less than a predetermined value in double correlation in which the first correlation operation $C_1$ and the second correlation operation $C_2$ are used to calculate the CFO estimation value $e^\Lambda$, wherein the first correlation operation $C_1$ is a function of a local copy of the PN sequence and not of the correlation interval P, and wherein the second correlation operation $C_2$ is a function of the local copy of the PN sequence and of the correlation interval P;

step (b1) calculating the CFO estimation value $e^\Lambda$ by narrowing the CFO tracking range by setting the correlation interval P to be greater than the predetermined value in step (a1); and step (c1) calculating the CFO estimation value $e^\Lambda$ using auto-correlation.

2. The CFO synchronization method of claim 1, further comprising step (d1) calculating the CFO estimation value $e^\Lambda$ by combining step (b1) and step (c1) that are independent to each other.

3. The CFO synchronization method of claim 1, wherein, in step (a1), the predetermined value of the correlation interval P is 44.

4. The CFO synchronization method of claim 1, wherein, in step (b1), the predetermined value of the correlation interval P is 4,200.

5. The CFO synchronization method of claim 1, wherein, in step (c1), a correlation length $L_a$ of the auto-correlation is the sum of sizes of a preamble and a postamble that are located in the frame head, and a correlation interval Q of the auto-correlation is obtained by subtracting the correlation length $L_a$ from a length of the frame head.

6. The CFO synchronization method of claim 2, wherein step (d1) comprises calculating the CFO estimation value $e^\Lambda$ by using a phase offset $\Phi_l$ calculated in step (b1) and a phase offset $\Phi s$ calculated in step (c1).

7. A carrier frequency offset (CFO) synchronization method of an orthogonal frequency division multiplexing (OFDM) receiver, wherein an OFDM frame comprises a guard interval including pseudo-noise (PN) sequences as a training signal, the CFO synchronization method comprising:

step (a) performing an initial CFO estimation pull-in step using double correlation based on a first correlation operation $C_1$ and a second correlation operation $C_2$ wherein the first correlation operation $C_1$ is a function of a local copy of the PN sequence and not of a correlation interval P, and wherein the second correlation operation $C_2$ is a function of the local copy of the PN sequence and of the correlation interval P between the first correlation operation $C_1$ and the second correlation operation $C_2$; and step (b) performing a coarse residue CFO estimate acquisition step using independent combination of the double correlation and auto-correlation.

8. The CFO synchronization method of claim 7, further comprising:

step (c) performing a small residue CFO tracking step by using the double correlation.

9. The CFO synchronization method of claim 7, wherein, in step (a), an initial CFO estimate is pulled in by widening a CFO tracking range by setting a correlation interval P, which is a parameter of the double correlation, to be less than a predetermined value.

10. The CFO synchronization method of claim 9, wherein the predetermined value of the correlation interval P is 44.

11. The CFO synchronization method of claim 7, wherein, in step (b), a coarse residue CFO estimate is acquired by using a phase offset $\Phi_I$ calculated using the double correlation and a phase offset $\Phi s$ calculated using the auto-correlation.

12. The CFO synchronization method of claim 11, wherein, in the double correlation, a CFO tracking range is narrowed by setting the correlation interval P for calculating the phase offset $\Phi s$ to be 4200.

13. The CFO synchronization method of claim 11, wherein, in the auto-correlation, a correlation interval Q for calculating the phase offset $\Phi_I$ is 255.

14. The CFO synchronization method of claim 8, wherein, in step (c), a small residue CFO is tracked by narrowing the CFO tracking range by setting the correlation interval P, which is a parameter of the double correlation, to be greater than a predetermined value.

15. The CFO synchronization method of claim 14, wherein the predetermined value of the correlation interval P is 4,200.

16. The CFO synchronization method of claim 8, further comprising:
   step (d) performing state conversion to step (b) after calculating the initial CFO estimate as repeatedly as a predetermined number $N_L$, when the initial CFO estimation pull-in step is performed in step (a).

17. The CFO synchronization method of claim 16, wherein, in step (d), the predetermined number $N_L$ is 50.

18. The CFO synchronization method of claim 8, further comprising:
   step (e) performing state conversion to step (c) by determining whether an integer K1 denoting that a residue CFO is a very small value maintains zero as many times as a predetermined number M when the coarse residue CFO estimate acquisition step is performed in step (b).

19. The CFO synchronization method of claim 18, wherein, in step (e) the predetermined number M is 5.

20. The CFO synchronization method of claim 8, further comprising:
   step (f) performing state conversion to step (b) by determining whether an integer K1 denoting that the residue CFO is a very small value does not maintain zero as many times as a predetermined number M when the small residue CFO tracking step is performed in step (c).

21. The CFO synchronization method of claim 20, wherein, in step (f), the predetermined number M is 5.

22. A carrier frequency offset (CFO) estimation apparatus of an orthogonal frequency division multiplexing (OFDM) receiver using pseudo-noise (PN) sequences in a guard interval of an OFDM frame as a training signal, the CFO estimation apparatus comprises:
   a correlator for performing a correlation operation; and
   a CFO estimator for calculating a CFO estimation value e^by using an output signal of the correlator,
   wherein the correlator and the CFO estimator pull-in an initial CFO estimate by using double correlation, and then acquire a coarse residue CFO estimate by independently using the double correlation and auto-correlation, and then track a small residue CFO by using the double correlation.

* * * * *